US012168206B2

(12) United States Patent
Winter

(10) Patent No.: US 12,168,206 B2
(45) **Date of Patent: *Dec. 17, 2024**

(54) DIRECT CHEMICAL INJECTION SYSTEMS AND METHODS

(71) Applicant: EnviroTech Water Treatment L.L.C., Colleyville, TX (US)

(72) Inventor: Stephen Michael Winter, Colleyville, TX (US)

(73) Assignee: EnviroTech Water Treatment L.L.C., Colleyville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,104

(22) Filed: Jun. 16, 2023

(65) Prior Publication Data

US 2023/0330608 A1 Oct. 19, 2023

Related U.S. Application Data

(63) Continuation of application No. 16/509,581, filed on Jul. 12, 2019, now Pat. No. 11,701,628.

(51) Int. Cl.

| | |
|---|---|
| ***B01F 25/00*** | (2022.01) |
| ***B01F 25/52*** | (2022.01) |
| ***B01F 27/1125*** | (2022.01) |
| ***B01F 27/80*** | (2022.01) |
| ***B01F 33/50*** | (2022.01) |

(Continued)

(52) U.S. Cl.
CPC .......... *B01F 25/52* (2022.01); *B01F 27/1125* (2022.01); *B01F 27/80* (2022.01); *B01F 33/50* (2022.01); *B01F 35/2111* (2022.01); *B01F 35/2205* (2022.01); *B01F 35/2207* (2022.01); *B01F 35/22141* (2022.01); *B01F 35/221422* (2022.01); *B01F 2101/49* (2022.01)

(58) Field of Classification Search
CPC ... B01F 25/52; B01F 27/1125; B01F 35/2111; B01F 33/50; B01F 35/221422; B01F 27/80; B01F 35/22141; B01F 35/2207; B01F 35/2205; B01F 2101/49
See application file for complete search history.

(56) References Cited

U.S. PATENT DOCUMENTS

| | | | |
|---|---|---|---|
| 3,604,213 | A | 9/1971 | Parsons |
| 4,533,254 | A | 8/1985 | Cook et al. |

(Continued)

*Primary Examiner* — Anshu Bhatia
(74) *Attorney, Agent, or Firm* — Shannon W. Bates; Harper & Bates LLP

(57) ABSTRACT

A system includes a recirculation line, a mainline flow meter operable to measure a flowrate of fluid flowing through the recirculation line, a mixing chamber, an inlet line coupled between the recirculation line and the mixing chamber, at least one chemical injection port coupled to the inlet line, a dedicated feed pump operably associated with each chemical injection port, and an outlet line coupled between the mixing chamber and the recirculation line. The mixing chamber includes a plurality of mixing zones, a mixing blade assembly that includes at least one blade within each mixing zone, and a motor coupled to the mixing blade assembly and operable to rotate the mixing blade assembly. Each of the dedicated feed pumps is coupled to a separate chemical supply and is operable to pump a chemical to the corresponding chemical injection port for injection into the inlet line.

17 Claims, 4 Drawing Sheets

(51) Int. Cl.

| | |
|---|---|
| ***B01F 35/21*** | (2022.01) |
| ***B01F 35/22*** | (2022.01) |
| ***B01F 35/221*** | (2022.01) |
| *B01F 101/49* | (2022.01) |

(56) References Cited

U.S. PATENT DOCUMENTS

| | | | | |
|---|---|---|---|---|
| 2002/0186613 | A1 | 12/2002 | Hiroaka et al. | |
| 2014/0261824 | A1* | 9/2014 | Byers | B24B 57/02<br>137/896 |
| 2016/0130192 | A1* | 5/2016 | des Garennes | C05G 5/27<br>71/27 |
| 2017/0259229 | A1* | 9/2017 | Chou | B01F 23/45 |

* cited by examiner

DIRECT CHEMICAL INJECTION SYSTEMS AND METHODS

CROSS-REFERENCE TO RELATED APPLICATIONS

This application is a continuation of U.S. Non-Provisional patent application Ser. No. 16/509,581, filed Jul. 12, 2019 and entitled "Direct Chemical Injection Systems and Methods," which is incorporated herein by reference for all purposes.

TECHNICAL FIELD

The present disclosure relates to systems and methods for accurately blending and injecting one or more chemicals into oilfield drilling and/or completion operations.

BACKGROUND

The oil and gas industry uses a variety of chemicals during oilfield drilling and/or completion operations, such as vertical drilling, horizontal drilling, hydraulic fracturing (i.e. "fracing"), well workovers, and coil tubing operations. For example, chemicals may be used to reduce friction, inhibit corrosion, reduce viscosity, remove or break foam, prevent the buildup of paraffin wax, and/or carry cuttings away from a drilling activity, as well as for many other purposes. Each chemical has a different blending characteristic and required injection rate to provide efficient chemical usage and optimal performance in the oilfield operation.

SUMMARY

In an implementation, a system according to the present disclosure comprises a recirculation line; a mainline flow meter operable to measure a flowrate of fluid flowing through the recirculation line; and a mixing chamber comprising a plurality of mixing zones, a mixing blade assembly extending into the mixing chamber, the mixing blade assembly comprising at least one blade within each mixing zone, and a motor coupled to the mixing blade assembly and operable to rotate the mixing blade assembly. The system may further comprise an inlet line coupled between the recirculation line and the mixing chamber; at least one chemical injection port coupled to the inlet line upstream of the mixing chamber; a dedicated feed pump operably associated with each chemical injection port, each dedicated feed pump coupled to a separate chemical supply and operable to pump a chemical to the corresponding chemical injection port for injection into the inlet line; and/or an outlet line coupled between the mixing chamber and the recirculation line, downstream of the mainline flow meter.

In an implementation, the mixing blade assembly comprises an offset blade assembly comprising a plurality of blades of different diameters. The motor coupled to the mixing blade assembly may be driven by a variable frequency drive (VFD) to enable rotation of the mixing blade assembly at varying speeds. In an implementation, a rotation speed of the mixing blade assembly is determined based, at least in part, upon blending characteristics of a chemical-infused fluid flowing from the inlet line into the mixing chamber. In an implementation, the system further comprises a slipstream flow meter operable to measure a flowrate of fluid flowing through the inlet line upstream of the at least one chemical injection port. The dedicated feed pumps may be driven by variable frequency drives (VFDs) to enable pumping of each chemical at varying flowrates. In an implementation, each chemical flowrate is determined based on a desired injection rate into the inlet line. The desired injection rate of each chemical may be based, at least in part, on a real-time flowrate measured by the mainline flow meter. In an implementation, the system further comprises a programmable logic controller (PLC) operably coupled to at least one of the mainline flow meter, the motor, and the dedicated feed pumps. In an implementation, at least a portion of the system is skid mounted.

In another implementation, a system according to the present disclosure comprises a mainline flow meter operable to measure a flowrate of fluid flowing through a recirculation line, an inlet line leading from the recirculation line into a mixing chamber, and a chemical injection port on the inlet line operable to inject a chemical into fluid flowing through the inlet line to form a chemical-infused fluid. In an implementation, the mixing chamber blends the chemical-infused fluid received from the inlet line. The blended chemical-infused fluid may then flow from the mixing chamber into the recirculation line.

In various implementations, the chemical is injected at a dosage rate determined, at least in part, on the flowrate measured by the mainline flow meter; the mixing chamber blends the chemical-infused fluid at a speed determined, at least in part, on blending characteristics of the chemical; and/or the mixing chamber comprises a mixing blade assembly extending into the mixing chamber, and the mixing blade assembly comprises a plurality of blades of varying diameters. In a further implementation, a programmable logic controller (PLC) is operably coupled to monitor and control the system. In various implementations, the PLC is operable to control when the chemical is injected into fluid flowing in the inlet line, the PLC is operable to modify a flowrate of the chemical injected into fluid flowing in the inlet line, the PLC is operable to control a speed at which the mixing chamber blends the chemical-infused fluid, and/or the PLC is operably coupled to a network that enables remote monitoring and control of the system.

In yet another implementation, a system according to the present disclosure comprises an injection system operable to inject a chemical into a drilling fluid at a variable dosage rate to form a chemical-infused fluid; a mixing chamber operable to receive and blend the chemical-infused fluid to form a blended chemical-infused fluid; a recirculation line operable to receive the blended chemical-infused fluid, the recirculation line operatively coupled to an oilfield operation; and a programmable logic controller (PLC) operable to vary the dosage rate based, at least in part, on a real-time flow rate of fluid within the recirculation line.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

The oil and gas industry uses various chemicals, including hard to blend gels and polymers, to enhance drilling and completion activities. These chemicals are generally provided in concentrated form and must be blended with proper amounts of hydration and with appropriate shear to activate the chemicals for optimum performance. Conventionally, the oil and gas industry has relied upon large mix plant systems to accomplish this task. These mix plant systems employ large steel tanks with impeller mixers, and the various chemicals are added manually by hand to the steel tanks. Once a chemical is blended, the injection rate for each chemical is determined based on estimates provided by the onsite engineering team, and modifications to the injection rates are determined based on feedback from the drilling rig. This manual system of operation is cumbersome, labor intensive, and imprecise, often resulting in under dosing or over dosing chemicals to the drilling or completion system. This may lead to increased chemical costs and/or damage to the drilling system itself due to improperly blended chemicals and/or inaccurate chemical injection rates.

The present disclosure is directed to automated systems and methods for accurately blending and injecting one or more chemicals into oilfield drilling and/or completion operations. The systems and methods are designed to accurately feed and blend one or more chemicals within a mixing chamber, inject the blended chemicals into the drilling operation at proper dosage rates based on a measured drilling system flowrate, and modify chemical dosage rates based on real-time flowrate monitoring and process control.

Figure 1:
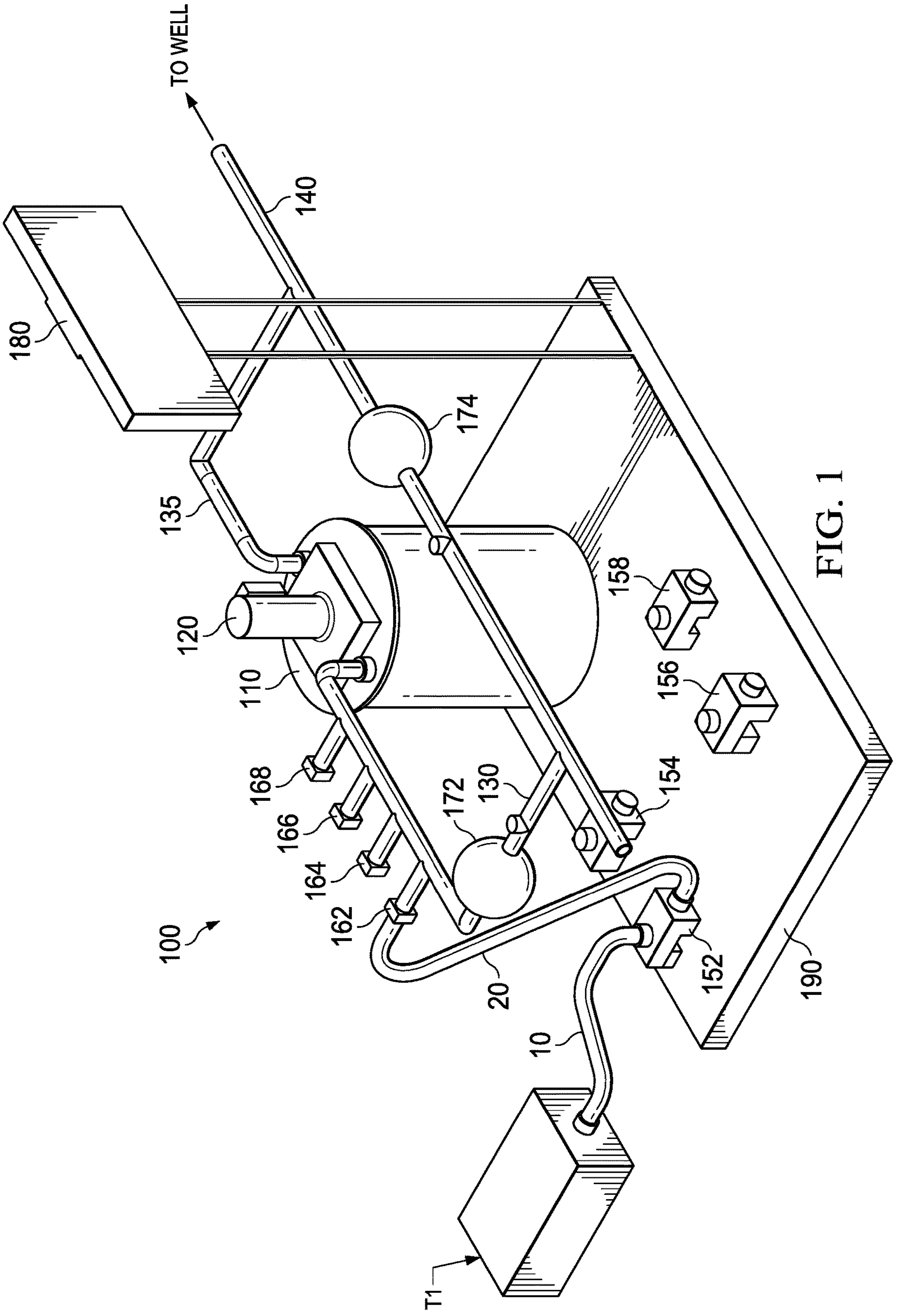
FIG. 1 illustrates a perspective view of one implementation of a direct chemical injection system in accordance with the present disclosure.
Figure 2:
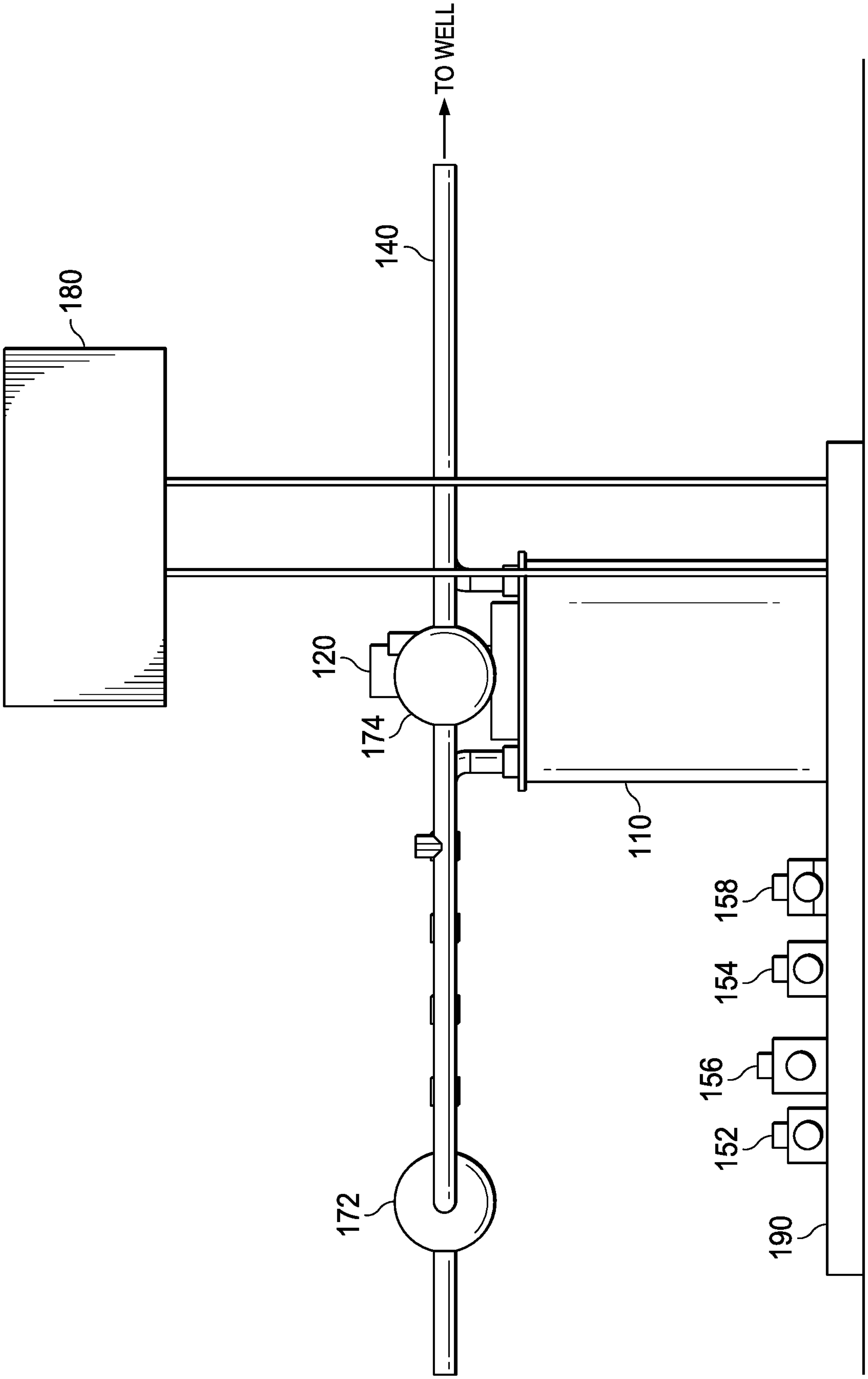
FIG. 2 illustrates a front elevational view of the direct chemical injection system of FIG. 1 in accordance with the present disclosure.
Figure 3:
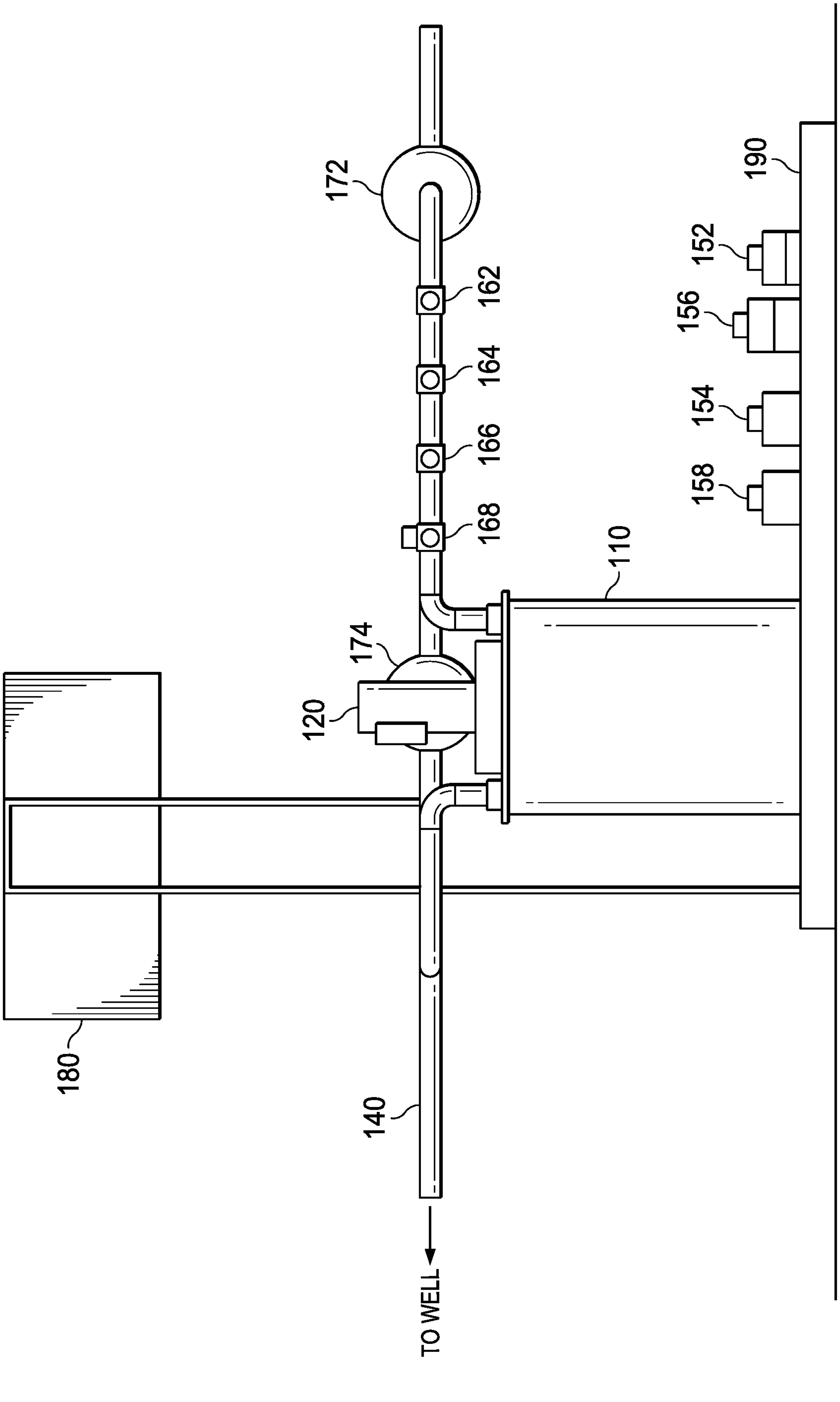
FIG. 3 illustrates a rear elevational view of the direct chemical injection system of FIG. 1 in accordance with the present disclosure.

FIGS. 1-3 illustrate a perspective view, a front elevational view, and a rear elevational view, respectively, of an implementation of an automated direct chemical injection system 100 according to the present disclosure. The system 100 comprises a mixing chamber 110 with a motor 120 operable to drive a mixing blade assembly within the mixing chamber 110, as will be described in more detail herein. In one implementation, the motor 120 is operated by a variable frequency drive (VFD) that enables rotation of the mixing blade assembly at varying speeds within the mixing chamber 110.

The mixing chamber 110 is positioned between an inlet line 130 and an outlet line 135. The inlet line 130 is coupled to and draws fluid, such as drilling fluid or completion fluid, from a rig recirculation line 140 for delivery into the mixing chamber 110. The outlet line 135 is coupled to and injects chemical-infused fluid from the mixing chamber 110 into the rig recirculation line 140, which in turn flows on to the well.

A slipstream flow meter 172 may be provided along the inlet line 130 between the recirculation line 140 and the mixing chamber 110 to measure the fluid flowrate through the inlet line 130. A mainline flow meter 174 may be provided to measure the fluid flowrate in the recirculation line 140. In some implementations, the flow meters 172, 174 may be magnetic flow meters or electromagnetic flow meters. Although FIGS. 1-3 depict two flow meters 172, 174, the present disclosure contemplates the use of any number of flow meters, as well as various sensors, valves and other components that may be useful for monitoring and controlling the system 100.

One or more chemical injection ports 162, 164, 166, 168 may also be provided along the inlet line 130 for injection of various chemicals into the inlet line 130, downstream of the slipstream flow meter 172 and upstream of the mixing chamber 110. Referring to FIG. 1, a separate chemical tote T1 may be used to store each chemical to be injected into the system 100. For each chemical tote T1, a suction line 10 is coupled between the chemical tote T1 and a dedicated chemical feed pump 152, which is operable to pump that specific chemical through a discharge line 20 coupled to a corresponding chemical injection port 162 and into the inlet line 130. Quick connect hose fittings, such as camlock fittings, may be used to couple the suction line 10 to the chemical tote T1 and to the dedicated feed pump 152. Camlock fittings may also be used to couple the discharge line 20 to the dedicated feed pump 152 and to the chemical injection port 162.

Although FIG. 1 depicts one representative chemical tote T1 and its corresponding suction line 10 and discharge line 20, the system 100 of FIGS. 1-3 is designed to accommodate up to four different chemicals from four separate chemical totes. To inject four different chemicals, a separate suction line would extend between each separate chemical tote and the corresponding dedicated feed pumps 152, 154, 156, 158, which would each pump the respective chemical through a separate discharge line into a corresponding chemical injection port 162, 164, 166, 168 and into the inlet line 130. In this manner, up to four different chemicals may be simultaneously or sequentially injected into the drilling/completion fluid flowing through the inlet line 130 and into the mixing chamber 110. However, the present disclosure contemplates the use of any number of dedicated feed pumps and corresponding chemical injection ports to accommodate any number of desired chemicals to enhance the performance of a drilling and/or completion operation.

In some implementations, the dedicated feed pumps 152, 154, 156, 158 may be progressive cavity pumps designed to transfer a known quantity of chemical with each progressive turn of the rotor. In some implementations, the motors driving the dedicated feed pumps 152, 154, 156, 158 may include variable frequency drives (VFDs), which allow for faster or slower pump speeds, and therefore, faster or slower chemical injection rates. In this manner, a known flowrate of each chemical may be injected into the inlet line 130 upstream of the mixing chamber 110. The required injection rate, or dosage rate, of each chemical will depend upon a variety of factors, including the total flowrate in the recirculation line 140 as measured by the mainline flow meter 174, the flowrate in the inlet line 130 as measured by the slipstream flow meter 172, and the blending characteristic of the chemical, including the required hydration.

Depending upon the blending characteristics of the various chemicals, the chemicals may be injected into the inlet line 130 either simultaneously or sequentially for blending/shearing within the mixing chamber 110 to activate the chemicals for optimum performance. For example, polymers are typically blended separately from other chemicals within the mixing chamber 110, and in the case of polymers, the blending/shearing process involves unwinding the polymer chain.

Figure 4:
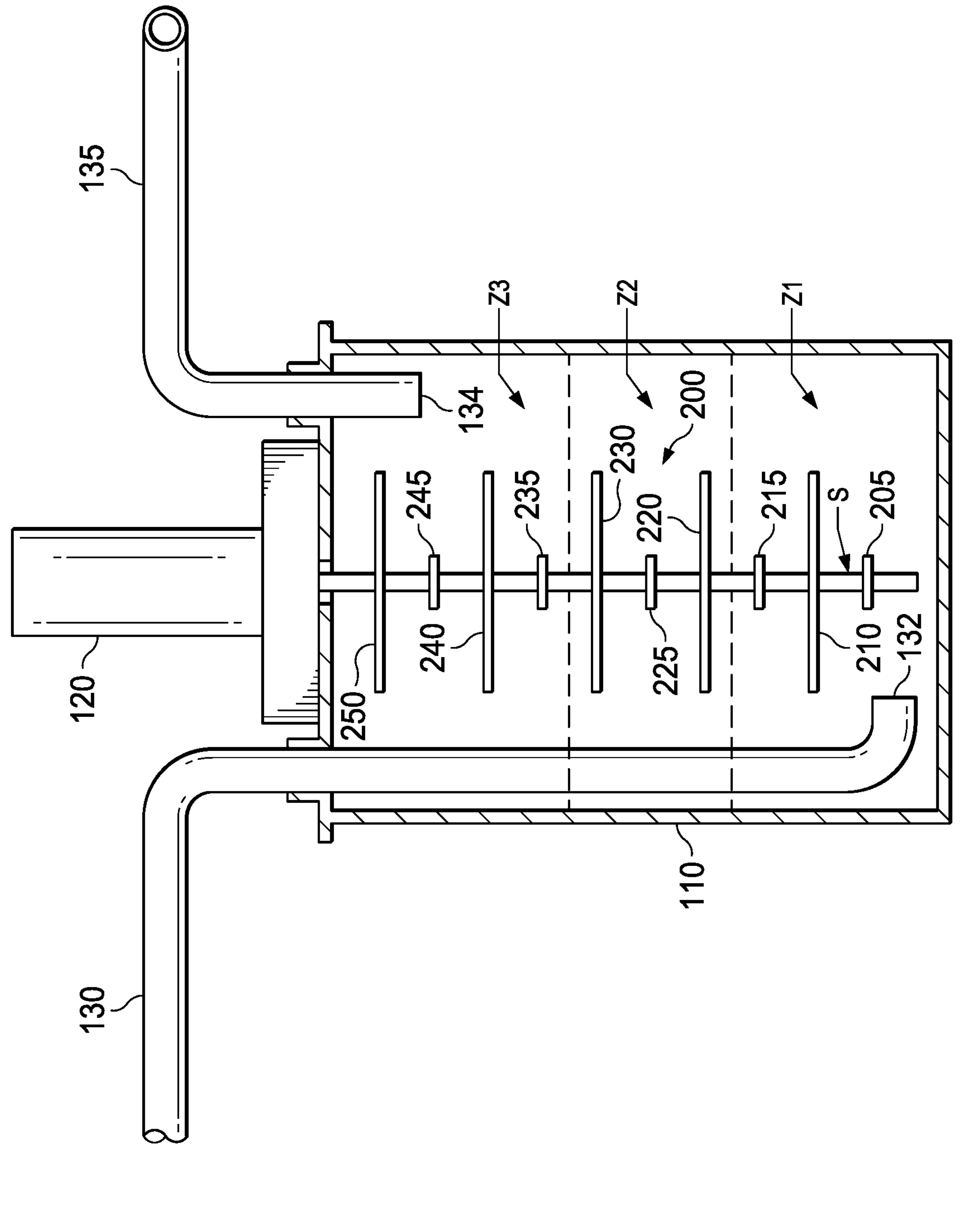
FIG. 4 illustrates a front elevational view, partially in cross-section, of an implementation of a mixing chamber in accordance with the present disclosure.

Referring now to FIG. 4, a side elevational view of the mixing chamber 110 is shown in cross section, with the inlet line 130 leading into the mixing chamber 110 and the outlet line 135 leading out of the mixing chamber 110. A mixing blade assembly 200 is operationally coupled to the motor 120. The mixing blade assembly 200 extends downwardly into the mixing chamber 110. In some implementations, the mixing blade assembly 200 is an offset blade mixer comprising a shaft S supporting a plurality of different size (diameter) blades 205, 210, 215, 220, 225, 230, 235, 240, 245, 250 spaced apart along the shaft S. The interior of the mixing chamber 110 may form a plurality of mixing zones Z1, Z2, Z3, and each zone may include one or more of the mixing blades therein. Although FIG. 4 depicts three mixing zones and ten mixing blades of varying diameters, the present disclosure contemplates any number of mixing zones and any number of mixing blades with any size diameter, whether varying or identical, to achieve desired blending and shear of the chemicals being injected into the drilling and/or completion operation.

In some implementations, the inlet line 130 extends down into the mixing chamber 110 to deliver the chemical-infused fluid through an exit 132 near the bottom of the mixing chamber 110, within mixing zone Z1. In some implementations, the entrance 134 to the outlet line 135 is positioned near the top of the mixing chamber 110, within mixing zone Z3. During operation, after delivery of the chemical-infused fluid through exit 132 into mixing zone Z1, the chemical-infused fluid traverses a tortuous path upwardly through mixing zone Z2 and mixing zone Z3 to reach the outlet line 135. The tortuous path of the chemical-infused fluid includes traversing upwardly through the mixing chamber 110 while experiencing shear forces caused by rotation of the blades 210, 215, 220, 225, 230, 235, 240, 245, 250 of the mixing blade assembly 200. If the motor 120 rotating the mixing blade assembly 200 is operated by a VFD, the speed of rotation may be adjusted to achieve the required amount of shear and blending of the chemicals before the chemical-infused fluid exits the mixing chamber 110 into outlet line 135 to then flow into the recirculation line 140. In some implementations, the injection rate may range from 0 to 10 barrels/minute. A typical injection rate may range from 2 to 3 barrels/minute.

Referring again to FIGS. 1-3, at least a portion of the system 100 may be mounted onto a skid 190 for ease of transportation and delivery to an operational drilling and/or completion site. In some implementations, when the skid 190 is delivered to an operational site, the recirculation line 140 is coupled into an existing rig recirculation system. The chemical totes (such as tote T1) may also be delivered separately from the skid 190, to be coupled to an appropriate dedicated feed pump (such as feed pump 152).

The system 100, or components thereof, including but not limited to the motor 120 driving the mixing blade assembly 200 within the mixing chamber 110, the meters 172, 174, and the motors driving the dedicated feed pumps 152, 154, 156, 158, may be monitored and controlled by a programmable logic controller (PLC) 180. The PLC 180 may be mounted on the skid 190 or may be separately provided. The PLC 180 may be rack mounted and may include a power supply, an input module, an output module, a processor or central processing unit (CPU), and a programming unit/software. In some implementations, the programming unit may comprise a personal computer, a laptop computer, a tablet, or a mobile phone. The PLC 180 may be dedicated to operation of the system 100, or the PLC 180 may control the system 100 along with other features of the drilling and/or completion operation. The PLC 180 may collect and display chemical feed data and process data associated with the drilling and/or completion operation. The PLC 180 allows for onsite monitoring and control, and may be interfaced with a network to enable remote monitoring and control.

In operation, the automated direct chemical injection systems of the present disclosure may be used to properly blend and accurately dose oilfield chemicals used in drilling and/or completion activities while eliminating the need for large mixing plants and the associated manual labor. The systems and methods of the present disclosure allow for real-time monitoring and process control of the chemical injection operation, as well as onsite ticketing and billing once the chemical injection operation is complete.

In some implementations, engineers input into the PLC 180 the estimated dosage rates for the various chemicals that will be used for a particular job. Once drilling or completion activities commence, the PLC 180 monitors the flowrate measured by the mainline flow meter 174 to determine the dosage rate of each chemical to inject into the inlet line 130. The PLC 180 also monitors the flowrate measured by the slipstream flow meter 172 to determine the quantity of chemical to inject into the inlet line 130 to achieve proper hydration. The PLC 180 then delivers the determined dosage rate and quantity of each chemical by adjusting the speed of the VFDs operating the dedicated feed pumps 152, 154, 156, 158 associated with those chemicals. The dedicated feed pumps 152, 154, 156, 158 thereby pump the chemicals through the corresponding chemical injection ports 162, 164, 166, 168 and into the drilling or completion fluid flowing in the inlet line 130.

Once the chemicals are injected into the inlet line 130, the chemical-infused fluid flows into the mixing chamber 110. The PLC 180 then operates the motor 120 by adjusting the speed of the VFD to achieve the desired rotation of the mixing blade assembly 200 to provide proper blending/shearing to activate the chemical or chemical combination. This rotation of the mixing blade assembly 200, and the tortuous path traversed by the chemical-infused fluid flowing through the mixing zones Z1, Z2, Z3 of the mixing chamber 110, results in consistent shearing/blending of the chemical(s).

After the chemical-infused fluid is sheared/blended in the mixing chamber 110, the fluid flows through the outlet line 135 for injection into the recirculation line 140 that leads to the well. As this chemical-infused fluid is injected, the PLC 180 may receive feedback on the real-time performance of the drilling and/or completion operation to confirm that the chemical dosage rates are correct. Adjustments can be made as necessary to achieve desired dosage rates and performance. As operations continue, the PLC 180 can run the dedicated feed pumps 152, 154, 156, 158 as necessary to supply the various chemicals based on the current flowrate measured by the mainline flow meter 174 in the recirculation line 140. The operator is only required to make sure there is sufficient chemical in the chemical totes coupled to the dedicated feed pumps 152, 154, 156, 158, while other aspects of the operation are automated.

Thus, the direct chemical injection systems and methods of the present disclosure enable consistent blending and accurate dosing of oilfield chemicals, collection and display of process and chemical feed data, modification of chemical injection rates based on real-time system flowrate, onsite and remote monitoring and control, elimination of manual chemical additions and large mix plant systems, and reduction in chemical costs and drilling rig damage due to under or over dosing of chemicals.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:

a mixing chamber comprising a plurality of vertically stacked mixing zones;

a mixing blade assembly extending into the mixing chamber, the mixing blade assembly comprising at least one blade within each mixing zone;

a motor coupled to the mixing blade assembly and operable to rotate the mixing blade assembly;

an inlet line operable to deliver fluid into a lower mixing zone of the plurality of vertically stacked mixing zones of the mixing chamber;

an outlet line operable to receive fluid from an upper mixing zone of the plurality of vertically stacked mixing zones of the mixing chamber for delivery out of the mixing chamber;

an injection system operable to inject at least one chemical into a fluid flowing in the inlet line to form a chemical-infused fluid; and a programmable logic controller (PLC) operably coupled to monitor and control the system;

wherein the chemical-infused fluid is the fluid delivered by the inlet line into the lower mixing zone of the plurality of vertically stacked mixing zones of the mixing chamber;

wherein the mixing blade assembly blends the chemical-infused fluid delivered into the mixing chamber by the inlet line; and wherein the blended chemical-infused fluid is the fluid received by the outlet line from the upper mixing zone of the plurality of vertically stacked mixing zones of the mixing chamber for delivery out of the mixing chamber.

2. The system of claim 1, wherein the inlet line extends downwardly into the mixing chamber to deliver fluid to the lower mixing zone of the plurality of vertically stacked mixing zones.

3. The system of claim 1, wherein the outlet line extends downwardly into the mixing chamber to receive fluid from the upper mixing zone of the plurality of vertically stacked mixing zones.

4. The system of claim 1, wherein the mixing blade assembly comprises an offset blade assembly comprising a plurality of blades of different diameters.

5. The system of claim 1, wherein the motor coupled to the mixing blade assembly is driven by a variable frequency drive (VFD) to enable rotation of the mixing blade assembly at varying speeds.

6. The system of claim 1, wherein the PLC is operably coupled to a network that enables remote monitoring and control of the system.

7. The system of claim 1, wherein the PLC is operable to control when the at least one chemical is injected into the fluid flowing in the inlet line.

8. The system of claim 1, wherein the PLC is operable to modify the flowrate of the at least one chemical injected into the fluid flowing in the inlet line.

9. The system of claim 1, wherein the PLC is operable to control a speed at which the mixing blade assembly blends the chemical-infused fluid.

10. The system of claim 9, wherein the speed is determined, at least in part, on blending characteristics of the at least one chemical.

11. The system of claim 1, further comprising:

a recirculation line;

wherein the inlet line couples to the recirculation line upstream of the mixing chamber; and wherein the outlet line couples to the recirculation line downstream of the mixing chamber.

12. The system of claim 11, further comprising:

a mainline flow meter operable to measure a flowrate of fluid flowing through the recirculation line.

13. The system of claim 12, wherein the at least one chemical is injected at a dosage rate determined, at least in part, on the flowrate measured by the mainline flow meter.

14. The system of claim 1, wherein the injection system comprises:

at least one chemical injection port coupled to the inlet line upstream of the mixing chamber;

a dedicated feed pump operably associated with each chemical injection port, each dedicated feed pump coupled to a separate chemical supply and operable to pump a chemical to the corresponding chemical injection port for injection into the inlet line to form the chemical-infused fluid.

15. The system of claim 14, wherein each of the dedicated feed pumps is driven by a variable frequency drive (VFD) to enable pumping of each chemical at varying flowrates.

16. The system of claim 14, further comprising:

a slipstream flow meter operable to measure a flowrate of fluid flowing through the inlet line upstream of the at least one chemical injection port.

17. The system of claim 1, wherein at least a portion of the system is skid mounted.

* * * * *